United States Patent [19]
Vogel et al.

[11] Patent Number: 5,125,431
[45] Date of Patent: Jun. 30, 1992

[54] THERMOPLASTIC WATER MANIFOLD AND METHOD OF MAKING SAME

[75] Inventors: James D. Vogel, Anoka, Minn.; Kenneth W. Schneider, Mason City, Iowa

[73] Assignee: IMI Cornelius Inc., Anoka, Minn.

[21] Appl. No.: 716,419

[22] Filed: Jun. 17, 1991

Related U.S. Application Data

[63] Continuation of Ser. No. 448,791, Dec. 11, 1989, abandoned, which is a continuation-in-part of Ser. No. 180,515, Apr. 12, 1988, Pat. No. 4,913,183.

[51] Int. Cl.⁵ .......................... B67D 5/56; F16L 55/18
[52] U.S. Cl. .................................. 137/561 A; 285/21; 285/197
[58] Field of Search .......................... 137/15, 561 A; 222/129.1; 285/21, 197; 251/145

[56] References Cited

U.S. PATENT DOCUMENTS

| | | | |
|---|---|---|---|
| 3,002,871 | 10/1961 | Tramm et al. | 285/21 |
| 3,649,055 | 3/1972 | Nilsen | 285/21 |
| 3,892,335 | 7/1975 | Schroeder | 222/129.1 |
| 4,253,224 | 3/1981 | Hickman et al. | 285/197 |
| 4,316,557 | 2/1982 | Benoun et al. | 222/129.1 |
| 4,624,487 | 11/1986 | Thalman | 285/21 |
| 4,712,578 | 12/1987 | White | 137/561 A |
| 4,722,560 | 2/1988 | Guest | 285/423 |
| 4,781,309 | 11/1988 | Vogel | 222/129.1 |

*Primary Examiner*—A. Michael Chambers
*Attorney, Agent, or Firm*—Sten Erik Hakanson

[57] ABSTRACT

A novel thermoplastic manifold and thermoplastic fluid fittings for the distribution of fluids, such as pressurized carbonated water, has an elongate tubular thermoplastic conduit with a plurality of apertures spaced along its length for receiving the thermoplastic fittings. Each fitting has a spud extending from one end thereof with a sonic energy director around the perimeter thereof. The fittings also include a saddle portion having a pair of arcuate sonic energy directing ridges thereon spaced on each side of the spud. Each fitting is fastened and sealed to the conduit by the sonic welding of the spud perimeter to the conduit aperture perimeter followed by the sonic welding of the saddle to the exterior surface of the tube.

6 Claims, 2 Drawing Sheets

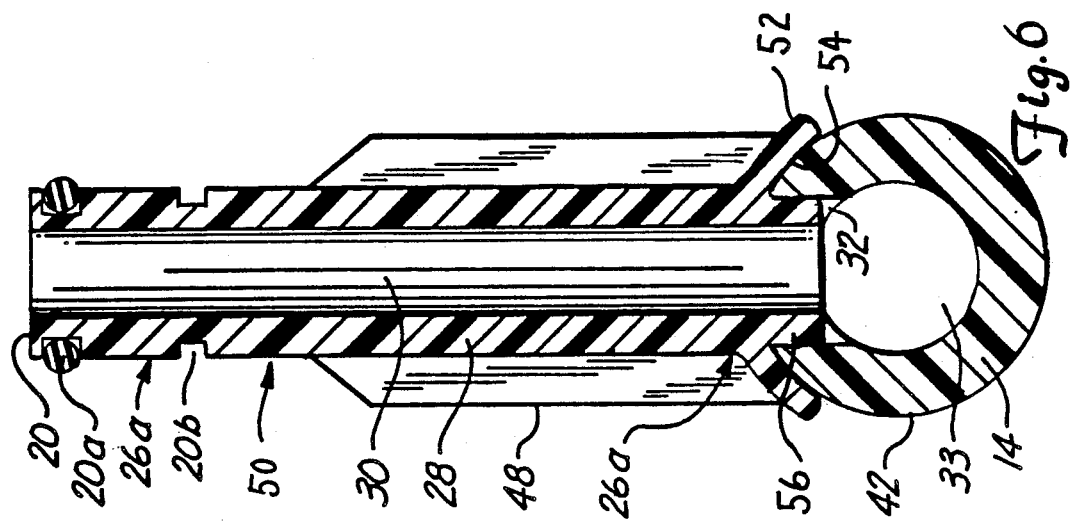
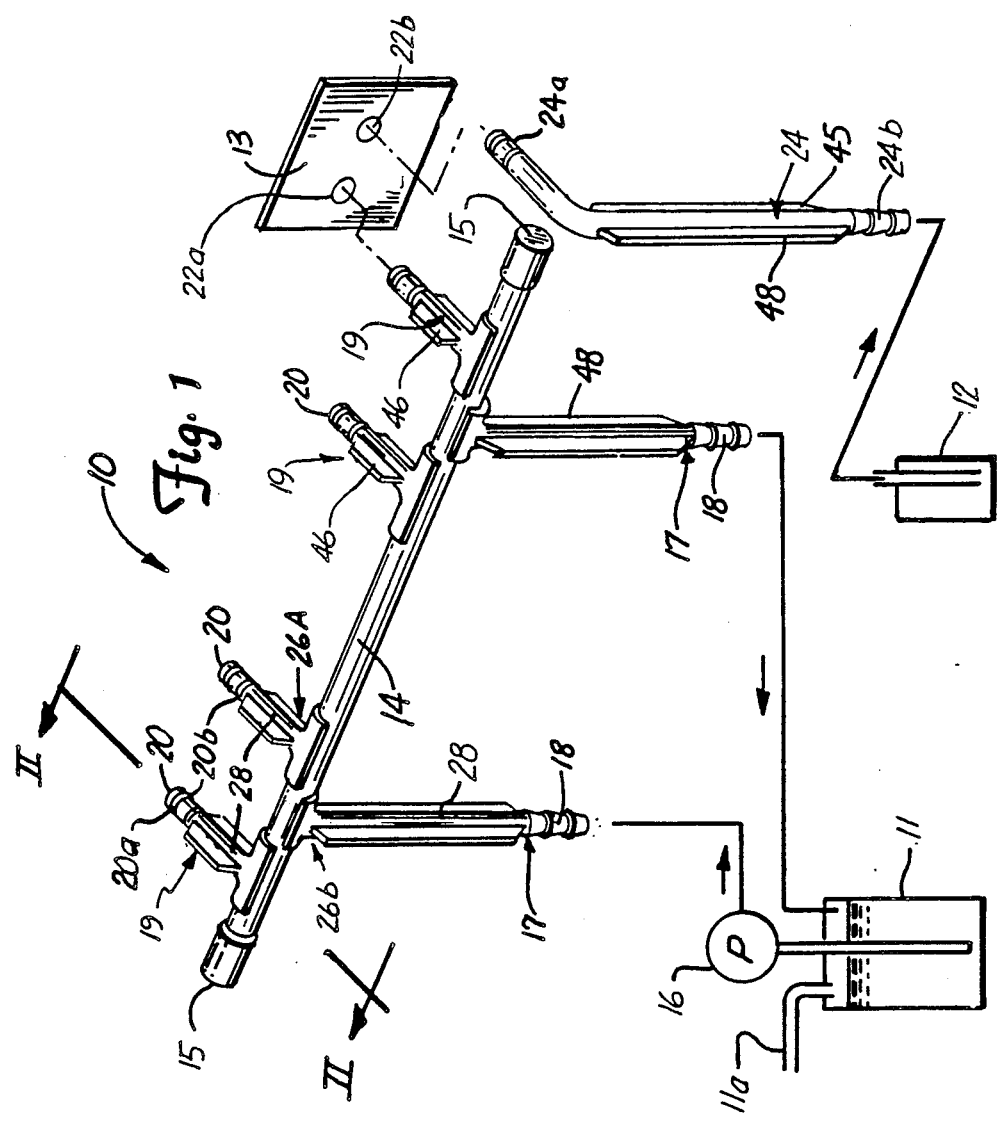

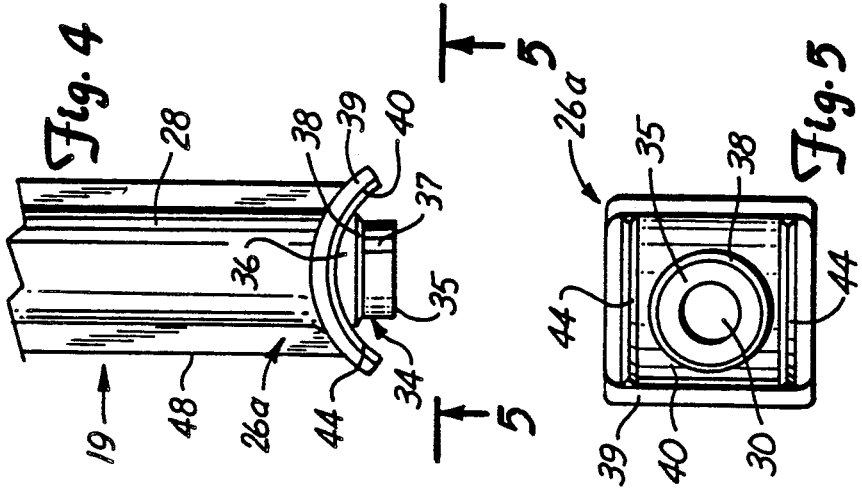
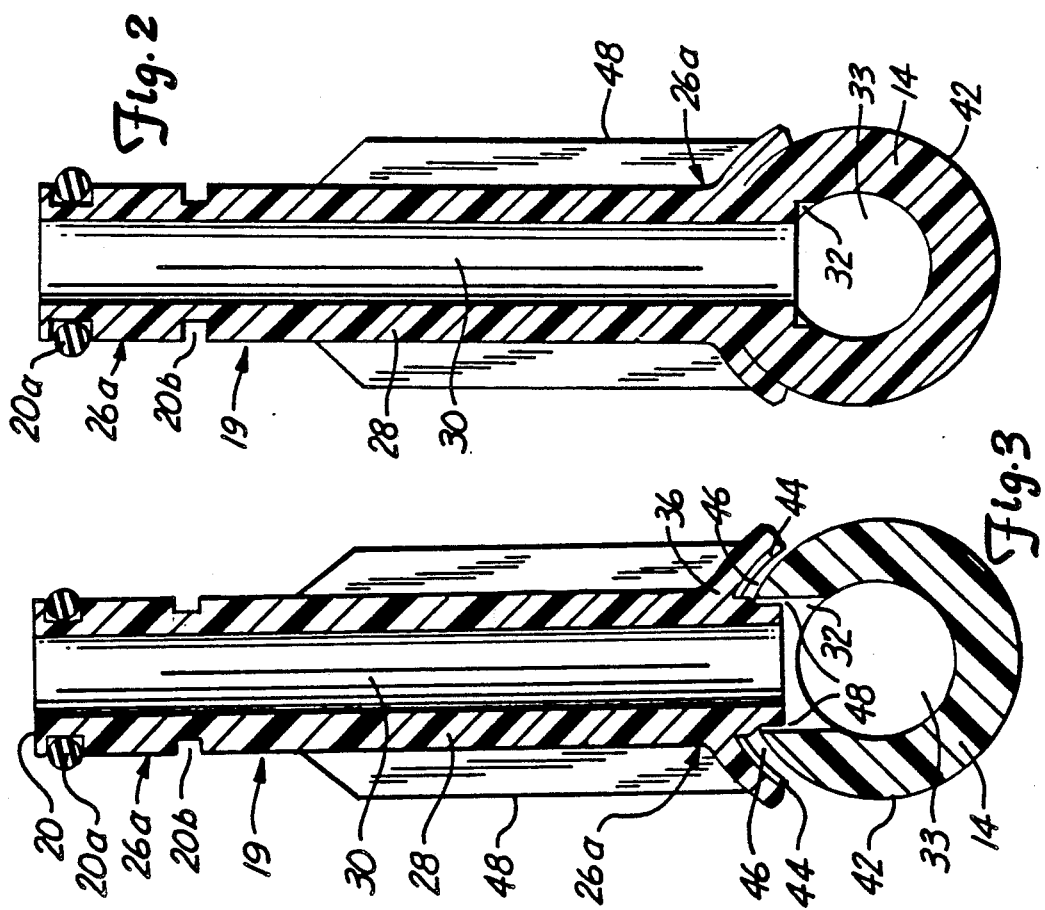

THERMOPLASTIC WATER MANIFOLD AND METHOD OF MAKING SAME

The present application is a co-pending continuation of application Ser. No. 07/448,791 filed Dec. 11, 1989 abandoned, which was a continuation-in-part of U.S. Ser. No. 180,515,, filed Apr. 12, 1988 now U.S. Pat. No. 4,913,183.

BACKGROUND OF THE INVENTION

1. Field of the Invention

This invention relates generally to fluid distribution manifolds, and more specifically to thermoplastic distribution manifolds for use in a beverage dispensing device.

2. The Prior Art

A post-mix carbonated beverage dispensing system generates its own carbonated water from a pressurized supply of potable water, and then distributes the carbonated water to a post-mix valve or valves. Each post-mix valve mixes carbonated water with syrup and effects dispensing of a complete beverage. These dispensers are typically used by fast food retailers, theaters, convention centers, sports facilities and the like.

Most all post-mix dispensers have some type of manifold structure to distribute carbonated water from a single source, which may consist of a single carbonator connected to a plurality of dispensing valves. A typical dispenser will include four dispensing valves, and it is not uncommon to see up to twelve dispensing valves being supplied from a single carbonator. The structure that distributes the carbonated water plays an important role in beverage quality, as carbonated water is a very delicate substance in that it can become decarbonated very easily by temperature increases or agitation. Therefore, a manifold made of a material having a high heat capacity, or structural flaws in the interior water passages thereof, can cause unwanted warming of, or turbulence in, the water flow resulting in reduced carbonation and poor beverage quality. One known structure for distributing carbonated water consists of a molded plastic housing with metal ferrules for an inlet and plural outlets. However, such a device is generally located at a remote location from the cooling structure and, during stand by time, carbonated water in the housing can warm up and, as a result thereof, decarbonate. Leakage, ferrule breakage, stress cracks, and sanitation are also continually reoccurring problems with such manifolds.

A metal block with a bored out center section having bored and tapped transverse apertures using adapter fittings, has also been used. This equipment is expensive, heavy, bulky, leaky, very difficult to sanitize and generally is not an effective solution. A typical example is seen in U.S. Pat. No. 3,175,578.

The most recently commercially used structure for distributing carbonated water includes a manifold made of an elongate length of stainless steel tubing forming an elongate plenum. At least one end of the tube is closed and the other end may be an inlet or may be closed, and several transverse fittings are welded into apertures drilled transversely into the plenum tube. This structure has been in use for several years and is the least costly, and most structurally efficient device known for distributing carbonated water in a post-mix dispenser. A typical example of this structure is shown in U.S. Pat. No. 3,892,335. However, a major problem with this type of manifold concerns the welding of the transverse fittings to the plenum tube. Specifically, the problem can result from such welding wherein the weld causes an obstruction to be formed within the tube. Such obstructions can cause undesirable turbulence in the flow of the carbonated water. The existence of one or more of such defective outlets can not be easily determined, visually or otherwise, prior to actual use. Consequently, maintaining a high level of quality control in the manufacture of such manifolds can be very troublesome and costly. Sanitation problems are also a concern due to small, hard to clean crevices that can exist as a result of the welding process that can provide a location for bacterial growth. It has been proven to be a very time consuming and expensive task to establish, in the field, that a dispensing problem is due to a defective manifold. Thus, flawed manifolds present a substantial problem for the food and beverage industry.

OBJECTS OF THE INVENTION

It is an object of this invention to provide for a fluid distribution manifold that eliminates or greatly reduces any unwanted turbulence in the flow of carbonated water therethrough.

It is an object of this invention to provide for a fluid distribution manifold that is easy to sanitize.

It is an object of this invention to provide for a fluid distribution manifold that reduces the rate of warming of any carbonated water held therein.

SUMMARY OF THE INVENTION

The fluid distribution manifold of the present invention includes an elongate thermoplastic conduit with an internal plenum or space, plugs closing the ends of the plenum, and a plurality of radial apertures extending through the tube and into the plenum space. A plurality of novel thermoplastic inlet and outlet fittings are secured to the plenum apertures. Each fitting has an elongate tubular body defining an interior fluid channel. The fluid channel extends through the fitting from a releasable connecting end to a conduit aperture connecting end. The aperture connecting end of each fitting has a spud extending therefrom for insertion into one of the apertures, and a convex saddle extending therefrom around the spud that conforms to and lies directly adjacent the exterior surface of the tube when the spud is inserted into an aperture. The spud includes a sonic welding energy director extending around the perimeter thereof for providing secure sonic welding of the perimeter of the spud to the conduit around the aperture perimeter. Further rigidity of such connection is provided for by sonic welding energy directors located on the interior surface of each saddle for providing securing of the saddle to the exterior surface of the plenum.

It was found that the manifold of the present invention, when formed by sonic welding of the particularly designed thermoplastic fittings results in a manifold having joints that are smooth and without the flaws that can cause unwanted turbulence of the carbonated water stream. Also, the superior smoothness of such joints greatly improves the ease of sanitation of such a manifold. Moreover, the use of thermoplastic provides for a manifold that better insulates the carbonated water stream against undesirable increases in the temperature thereof.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a perspective view of the preferred embodiment of the thermoplastic carbonated water distribution manifold of the present invention with a schematically represented beverage dispensing system.

FIG. 2 is a cross-sectional view taken through lines II—II of FIG. 1.

FIG. 3 is a cross-sectional view in accordance with FIG. 2 showing a fitting inserted into a tube aperture prior to the sonic welding there between.

FIG. 4 is a detailed plan view of an aperture connecting end of a fluid fitting.

FIG. 5 shows an end plan view of a fitting aperture end along lines 5—5 of FIG. 4.

FIG. 6 shows a cross-sectional view of an alternative embodiment of a fitting of the present invention.

DESCRIPTION OF THE PREFERRED EMBODIMENT

The carbonated water distribution manifold of the present invention is seen in FIG. 1, and generally indicated by the numeral 10. For the purpose of illustration it is understood that manifold 10 can be used in conjunction with a beverage dispensing system represented schematically, including a source of carbonated water 11, a source of syrup 12, and a beverage dispensing valve 13. Manifold 10 includes a hollow conduit or tube 14 having end caps or plugs 15. Carbonated water source 11 is connected to a pressurized water supply (not shown) by an inlet 11a, and typically includes a carbonated water circulating pump 16 and is fluidly connected therefrom to tube 14 by a circulating fitting 17 having a releasable hose connecting end 18. Water source 11 is also connected to conduit 14 by a further circulating fitting 17 to provide a return path for the circulation of carbonated water in the direction as indicated by the arrows in FIG. 1. A plurality of dispensing valve outlet fittings 19 are secured to tube 14 and include a dispensing valve connection end 20 having an O-ring 20a and an attachment means receiving annular groove 20b. As is know in the art, outlet ends 20 are designed for cooperation with the inlet 22a of a dispensing valve 13. Also as is understood in the art, dispensing valve 13 has a syrup inlet 22b for connection to a source of syrup 12. In the preferred form of the present invention, a portion of the line supplying syrup to valve 13 can consist of a thermoplastic angled tube 24 having an appropriate beverage valve connecting end 24a with a releasable hose connecting end 24b.

It will be understood by those of skill that fittings 17 and 19 have a channel running centrally along the axis thereof to provide for fluid flow therethrough. As the structure of what is referred to as tube connecting ends 26a and 26b thereof are proportionally the same, for purposes of efficiency of description herein, the structure of only an aperture connecting end 26a will be had. However, it will be understood that such description will apply equally to the tube connecting ends 26b of circulating fittings 17.

As seen in FIGS. 2, 3, and 4, fitting 19 includes an elongate tubular housing 28 defining an interior channel 30 extending therethrough between the ends 20 and 26a thereof for providing the communication of fluids therethrough. The manner of attachment of a fitting 19 to tube 14 can be understood by also referring to FIG. 5. Tube 14 can be understood by also referring to FIG. 5. Tube 14 includes a plurality of apertures 32 extending therethrough into the interior plenum of space 33 thereof. Apertures 32 are spaced from each other appropriately along the length of tube 14 with one aperture 32 being provided for each fitting 17 and 19. The axis of the apertures 32 that provide for attachment of fittings 19 are all in a line and are co-planar extending outwardly from the axis of tube 14. The attachment ends 26a each have a spud 34 having an end 35, an inner portion 36, an end portion 37 and an angled sonic welding energy directing surface 38 between spud portions 36 and 37. Surrounding spud 34 is a convex saddle 39 which is integral with the housing 28 of each fitting 19 and extends outwardly around spud 34. Saddle 39 has a convex interior arcuate shoulder surface 40 which has the same radius as, and is comformable to, the exterior surface 42 of tube 14. Saddle shoulder surface 40 includes a pair of arcuate sonic welding energy directing ridges 44 extending there along and outwardly therefrom. Saddle 39, arcuate shoulder surface 40 and arcuate energy directors 44 have an arcuate extent or length, as measured about the axis of tube 14, that is at least 90 degrees and preferably 120 degrees thereof. This arcuate extent is greater that of apertures 32 to provide for complete covering thereof.

In the manufacture of manifold 10 and in the practice of the method of the invention, tube 14 is cut to the desired length and apertures 32 are drilled therein. The plurality of fittings 17 and 19 are then sonically welded to tube 14. Specifically, tube 14 is placed upon a sonic welding anvil, not shown. A fitting 17 and 19 is loaded into a sonic welding horn, not shown, and the spud 34 thereof is piloted into an appropriate aperture 32 as represented in FIG. 2. It can be appreciated that angled energy directing surface 38 is, in part, of greater diameter than aperture 32 wherein fitting 17 or 19 can initially be inserted only to the point of contact between surface 38 and the perimeter of an aperture 32. As seen in FIG. 2, such initial position leaves a space 46 between tube surface 42 and saddle surface 40 wherein ridges 44 are held above surface 42. In addition, a space 46 exists between spud portion 37 and aperture 32. Also, it is preferable that apertures 32 are counterbored to give a flat exterior surface that allows for uniform contact thereof with energy director surface 38. Ultrasonic energy is then applied through the horn and the fitting 17 or 19 wherein the spud energy director 38 is driven into and fused to the tube 14 around the aperture 32, wherein a portion of the plastic material, primarily in spud portion 36, is melted and flows into an substantially fills clearance space 48. Thus, a near field weld is then produced around the perimeter of spud 34 and aperture 32. The near field weld extends from the spud portion 36 to the interior 33 of tube 14 and, as stated, substantially fills space 48. A "near field weld" is welding occurring within ¼ inch (6 mm) from the point of horn contact with the fitting 17 or 19.

As a result of the space 46 between ridges 44 and surface 42, such ridges are not initially welded to surface 42. However, it can be appreciated that as spud 34 is welded to aperture 32 it is further inserted therein, thus causing contact between the ridges 44 and surface 42. As a result thereof, ridges 44 are simultaneously welded to surface 42 subsequent to the welding of spud 34 to aperture 32. It will be appreciated by those of skill in the art, that this sequence of steps insures a better sealing weld between spud 34 and aperture 32 by concentrating the energy of the equipement at that point initially then followed by the welding of the saddle ridges 44 to surface 42. It can also be appreciated that during the welding of the saddle 39 to conduit 14 there will exist further time for welding of spud 34 to aperture 32. In this manner, a complete seal around the entire perimeter of spud 34 to aperture 32 is insured. Fitting 17 or 19, therefore, becomes essentially integral with tube 14, as is depicted in FIG. 2. The welds between the energy directors 38 and 44 and tube 14 consist of three structurally discrete welds. The weld around spud 34 provides a fluid tight seal for the flow of fluids, such as pressurized carbonated water, within manifold 10, as well as for retention of the fittings 17 or 19 to the tube 14. The arcuate sonic welds between the ridges 44 and surface 42 provide for stable reinforcement of the attachment of fittings 17 or 19 to tube 14, and in particular provide for stress distribution to prevent twisting or blow out thereof from tube 14.

Manifold 10 is extremely effective for carbonated water distribution. The particular structure of fitting attachment ends 26a and 26b and method of securing thereof to conduit 14 results in a manifold routinely free of defects that would result in disruption of carbonated water flow or sanitation problems. In addition, manifold 10 is made entirely of injection molded thermoplastic, there being no metal parts or metal welding. Thus, manifold 10 does not need pickling and passivating, and does not affect beverage taste or react with carbonic acid. Moreover, manifold 10 has low thermal conductivity to resist rapid warming of the carbonated water held therein, and is extremely suitable for being surrounded with urethane foam to provide for further thermal insulating thereof.

Fittings 17 and 19 and tube 24 each include a pair of fins 48 integral with an extending outwardly from the exterior thereof. Fins 48 lie in a common plane on opposite sides of each fitting 17 and 19 and tube 24 and provide for better holding of urethane foam poured there around to provide for additional insulating of manifold 10. Fins 48 are also useful in the manipulation of fittings 17 and 19 during the welding process. It can also be appreciated that manifold 10 is ideally suited for robotic asembly.

An alternate embodiment 50 of fitting 19 is represented in FIG. 6. Fitting 50 is the same in all respects as fitting 19 except that it does not include energy directors 38 and 44. Thus, saddle 52 has a flat ridgeless inner surface 54. Also, spud 56 has a tubular outer surface having no angled shoulder area, which outer surface is dimensioned slightly smaller than aperture 32 to provide for a snug fit therein. Fitting 50 is secured to tube 14 through the use of a suitable plastic adhesive. Thus, such an adhesive is applied to all of the inner surface 54 and the exterior surface of spud 56, after which spud 56 is inserted into an aperture 32 of tube 14. It can be appreciated that saddle 5 provides for a large bonding surfce area between fitting 50 and tube 14 so as to greatly increase the strength of the securing there between over what would be obtained by the securing of spud 56 to aperture 32 alone. It can be seen that such a securing approach can also result in a manifold being substantially free of turbulating defects, and that is resistant to leaks.

Although other advantages may be found and realized and various modifications may be suggested by those versed in the art, it should be understood that we wish to embody within the scope of the patent warranted hereon, all such embodiments as reasonable and properly come within the scope of our contributions to the art.

What is claim is:

1. A fluid distribution fitting made of a thermoplastic material, for sonically welding to an elongate tube having an internal plenum, to provide for fluid communication between the fitting and the plenum, for forming a fluid distributing manifold, the fluid distribution fitting comprising: an elongated body portion having an interior channel extending therethrough between a first fluid connecting end and a second tube connecting end, the second end having a spud portion integral therewith and extending therefrom for inserting into an aperture extending through the tube, and the spud having a sonic welding energy director consisting of an amount of the thermoplastic meterial integral therewith and extending around the exterior periphery thereof for providing such material for the sonic welding securing of the fitting to the tube.

2. The thermoplastic fluid distribution fitting as defined in claim 1, and further including a saddle, the saddle integral with the body portion and extending outwardly therefrom and around the circumference thereof in a direction transverse to the extension of the spud, and the saddle positioned adjacent the spud in a direction therefrom towards the first end, and the saddle having sonic welding directing means consisting of an amount of the thermoplastic material on a tube facing surface thereof for providing sonic welding of the saddle to the tube.

3. The thermoplastic fluid distribution fitting as defined in claim 2, and the spud energy director having a peripheral portion with a diarameter slightly greater than the diameter of the tube aperature ad where the spud energy director is positioned on the spud a slight distance from the saddle in a direction away from the first end.

4. The thermoplastic fluid distribution fitting as defined in claim 2, and the saddle conforming to the exterior dimension of the tube.

5. The thermoplastic fluid distribution fitting as defined in claim 4, and the saddle having a pair of sonic welding energy directing ridges consisting of a pair of beads of the thermoplastic material extending along the tube facing surface thereof on either side of the spud.

6. The tehermoplastic fluid distribution fitting as defined in claim 2, and further including a pair of fins integral with the exterior surface of the fitting and extending therealong on opposite sides thereof.

* * * * *